UNITED STATES PATENT OFFICE.

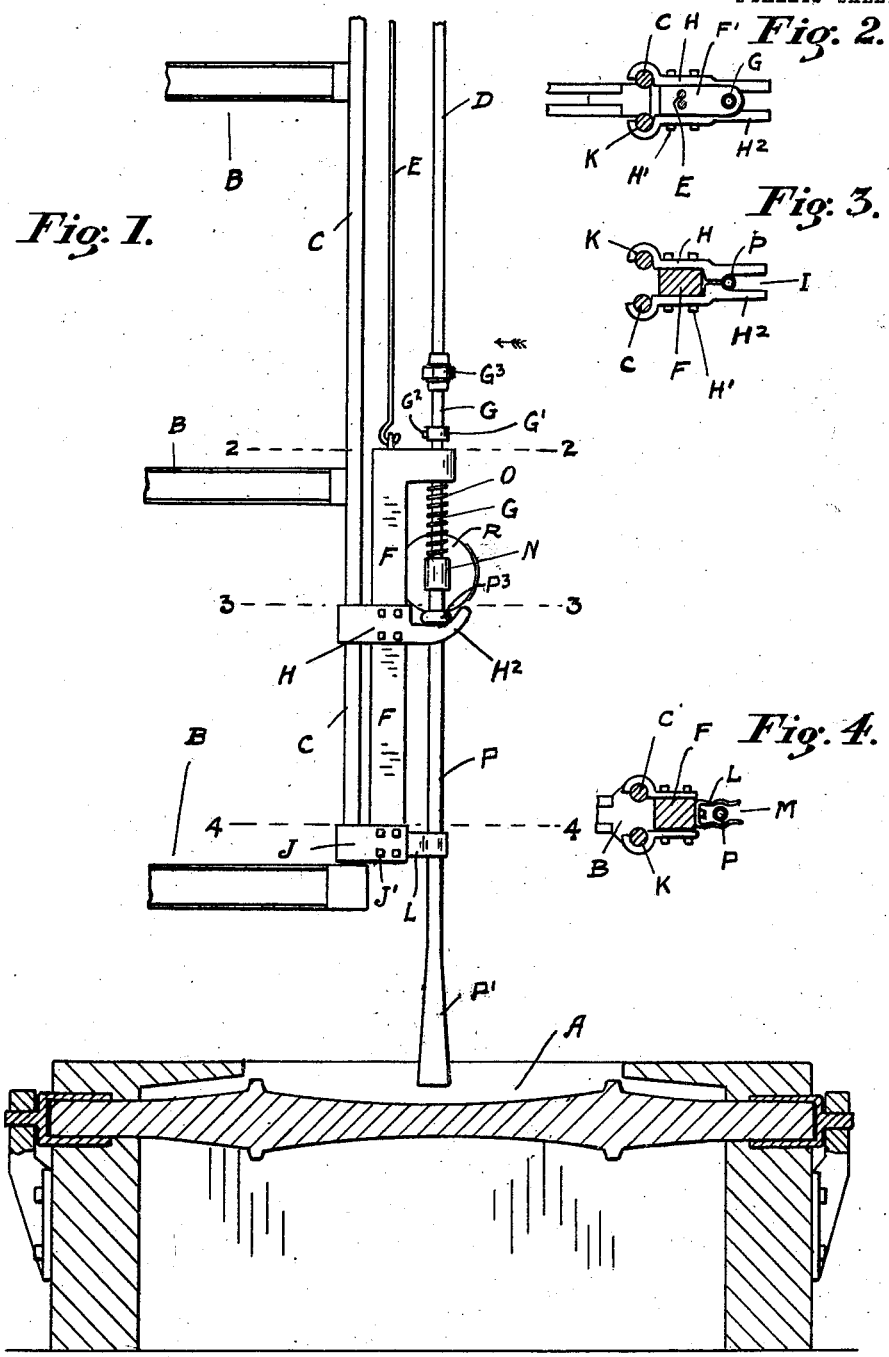

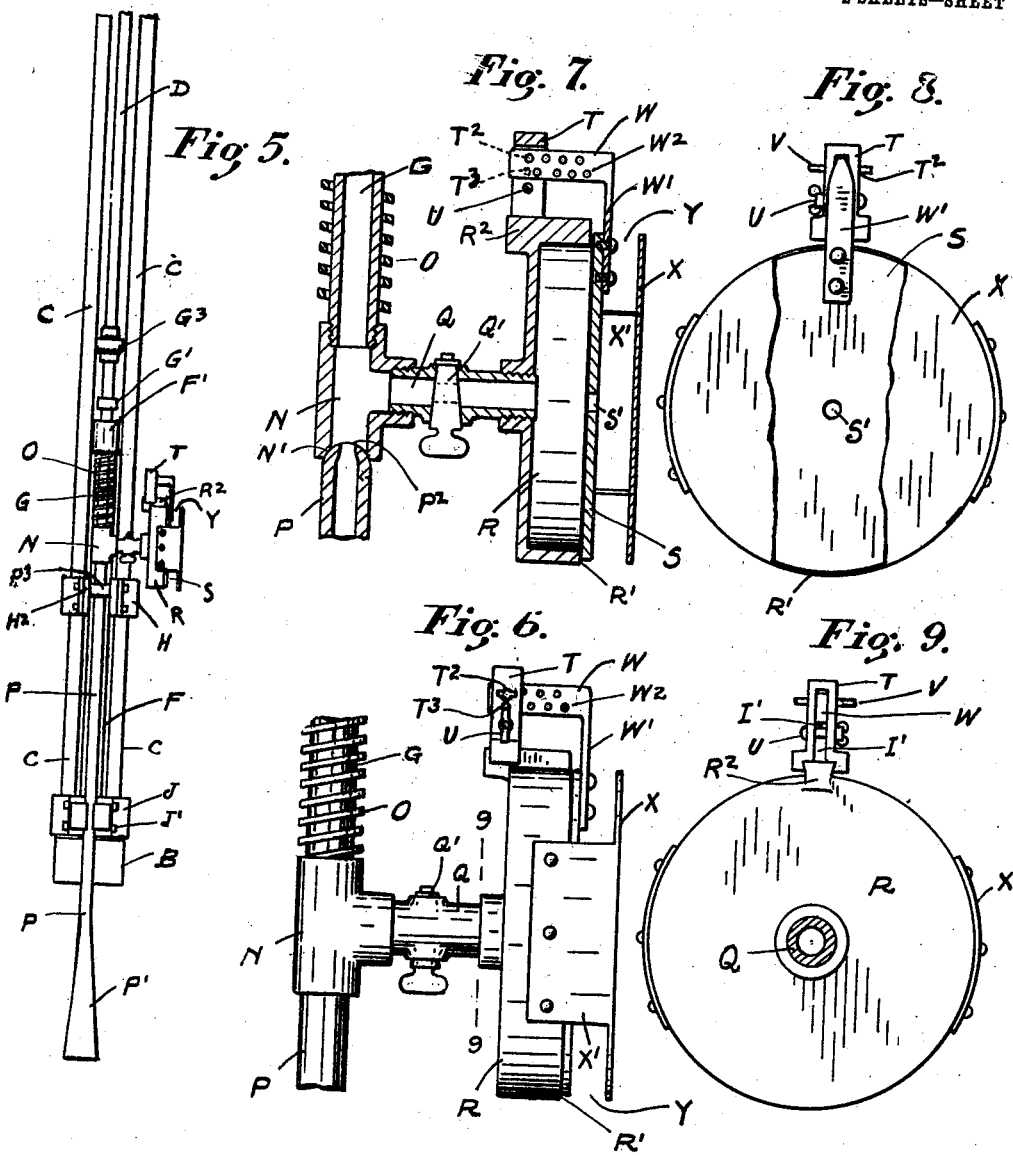

WILLIAM W. W. KEYES, OF ALEXANDRIA, INDIANA.

GLASS-FORMING MACHINERY.

935,663.  Specification of Letters Patent.  Patented Oct. 5, 1909.

Application filed January 16, 1908. Serial No. 411,100.

*To all whom it may concern:*

Be it known that I, WILLIAM W. W. KEYES, a citizen of the United States, and residing at the city of Alexandria, (R. F. D. No. 23,) Madison county, Indiana, have invented new and useful Improvements in Glass-Forming Machinery, of which the following is a specification.

My invention relates to improvements in that class of machinery used for the formation of the well known long tubes or cylinders from which window-glass is produced. In this type of machines, a carriage that supports a detachably retained blow-pipe is supported on a suitable structure and so arranged that it may be reciprocated vertically above the drawing-kiln or ladle in which the molten glass is retained, so that the end of the blow-pipe may be lowered into the molten glass and then raised. In this kind of machinery such construction of the raising and lowering means, and air-pipe connections have been adopted and such means of control of the movement of the carriage and of the air-pressure have been utilized, that the blowing or formation of these glass cylinders is accomplished with varying degrees of success. In the formation of these cylinders as hitherto practiced the air-pressure which fills the blow-pipe is temporarily released by removing a plug that movably fills a vent in the side of the blow-pipe; as the blow-pipe rises with its charge of glass the neck is first formed, then the plug is replaced in the vent of the blow-pipe, and as the latter continues to rise, the means for raising the carriage upon which the blow-pipe is carried, and the means for controlling the pressure of the air passing from the blow-pipe into the cylinder is so controlled, that the cylinder is gradually formed. Although the most delicately adjusted mechanisms for the raising of the carriage that supports the blow-pipe, and for the feeding of air into the same have been employed, and although great skill may be used in handling the same, the difficulty remains that however perfectly the air-pressure may be maintained in the glass-cylinder, if there is the least interruption in the upward movement of the blow-pipe, the air-pressure within the cylinder is affected and the result is that a puff or a distention of more or less extent is formed in the body of the cylinder and it is rendered imperfect. While cylinders in which these puffs occur may be later worked out in the process of reheating and flattening on the flattening stone, the product is objectionable because the surface will always bear the demarcations incident to its having had to be kept on the flattening stone for an abnormal length of time. Other deleterious results from these puffs or distentions are, that in the capping off operation on a cylinder having such imperfections, if the capping off wire should lie partly in the groove and partly on the ridge of the puff, the cylinder will almost invariably be shattered and destroyed.

Objects of my invention are to provide a carriage and attachments thereto, adapted to be employed in connection with the structure and with means already in use in glass-making machinery of the kind referred to for raising and lowering the blow-pipe and controlling the air-pressure, whereby the air-pressure in the cylinder that is being formed will be automatically maintained equable, and with that end in view my invention consists of the new construction, combination and arrangement of parts, and the objects of my invention are accomplished by the mechanism described herein, illustrated in the accompanying drawings, and pointed out in the appended claims.

Similar characters of reference refer to corresponding parts throughout the several views, in which—

Figure 1 is a side view showing my invention in position in readiness to be operated, the drawing-kiln being shown in section and the main portion of the supporting structure of the vertical guide-bars being not shown. Fig. 2 is a horizontal transverse sectional view taken on the line 2—2 Fig. 1. Fig. 3 is a horizontal transverse sectional view taken on the line 3—3 Fig. 1. Fig. 4 is a horizontal transverse sectional view taken on the line 4—4 Fig. 1. Fig. 5 is a view of my invention as seen in the direction indicated by the arrow in Fig. 1. Fig. 6 is an enlarged side view and Fig. 7 is a vertical central sectional view of the escapement-regulator. Fig. 8 is a front view of the escapement-regulator the central portion of the shield-plate having been broken away, and Fig. 9 is a rear view of the escapement-regulator taken on the line 9—9 Fig. 6.

In order to make clear the mode of application to use of my invention I have shown the drawing-kiln A, and a portion of the structure B, which supports and sustains in correct position the guide-bars C which are usually made of round iron or tubing and are so held in position that their outer surfaces are free and unobstructed.

D designates the air-supply pipe which is connected telescopically to like supervening pipes, and through which pipes the air for blowing the glass is passed.

E designates the usual member fastened to the carriage and connected to the power mechanisms employed for raising and lowering the carriage.

My improved carriage and escapement-regulator has the body F made of metal of substantial weight and thickness having the arm F¹ perforated vertically for the slidingly disposed air-pipe G which will be hereinafter referred to. Secured on the opposite sides of the body F at a suitable distance below the arm F¹ are the cross-head bars H. These cross-head bars are of the conformation as shown in Fig. 3, are secured in position by the bolts H¹, and have the horns H². The internal faces of these horns are so cut away that the recess I is formed. At the lower end of the body F are provided the cross-head bars J secured by the bolts J¹. The ends of the pairs of cross-head bars H and J are provided with the machined recesses K in which the guide bars C have suitable bearing. These recesses may be of varied shapes to conform to such shape as the guide-bars C may have.

Secured on the front face of the body at its bottom is the spring-clamp L having its oppositely disposed ends flared apart and so bent as to form the recess M as plainly shown in Fig 4.

Slidingly disposed in the arm F¹ is the metallic air-tube G having the collar G¹ secured thereon by the set-screw G². A union connection G³ is provided so that connection may be easily made to the air-pipe D forming a part of the machine to which my invention is applied and attached.

Secured on the bottom end of the air-tube G is the coupling N, its bottom having the cup-shaped socket N¹.

O designates a coil-spring its upper and lower ends being pressed against the arm F¹ and coupling N respectively so that the air-tube G is strained downwardly.

P designates the blow-pipe having the well known head P¹. The end P² of the blow-pipe is rounded in form to fit the socket N¹ of the coupling N. At a proper distance from its end the blow-pipe has the rigidly-secured collar P³ adapted to rest on the horns H² and support the blow-pipe in position. The ease with which the blow-pipe may be placed in position in the carriage and air-tight connection made with the air-tube G is readily apparent; the blow-pipe is disposed toward the horns H² so that the collar P³ will be engaged; the end P² then meets the socket N¹. As the blow-pipe swings downwardly it slides into the recess M formed by the tongues of the spring-clamp L and is retained yieldingly in the position as shown in Fig. 1.

Connected to the coupling N by the conduit Q that has the valve Q¹, is the air-drum R the frontal face R¹ of which is machined and against which face R¹ resides the machined disk S. Formed integral with the air-drum R is the dove-tail R² upon which is movably disposed the support-clamp T. This support-clamp is formed with the vertical slot I¹ and a recess at its bottom suitable to fit about the dove-tail R², and may be clamped at desired positions along the dove-tail, by the thumb-screw U.

T² and T³ designate holes in which the pin V is inserted. Upon this pin is supported pivotally the gage-arm W which has the downwardly extending leg W¹ to which is rigidly secured the disk S. The function of the hole S¹ that is provided in the disk, will be presently referred to. The diameter of the disk is slightly smaller than the outside diameter of the air-drum so that the disk in its movement into and out of contact with the face R¹ of the air-drum, will not impinge against the flanges X¹ of the shield-plate X. This shield-plate is made of sheet metal of proper gage, has the flanges X¹ riveted to the flange of the air-drum, and is so positioned that the openings Y are formed.

W² designates holes in the gage-arm W spaced as shown in Fig. 7 on two horizontal lines the same distance apart vertically as the distance between the holes T² and T³.

By the construction just described it will be observed that by adjusting the position of the support-clamp on the dove-tail and the use of the pin V in any desired one of the holes W², the normal pressure of the disk S against the face R¹ may be gaged to a nicety, so that in the slightly abnormal accumulation of air-pressure inside the drum R, the disk will be moved momentarily, and as soon as the pressure is relieved will instantly return to its normal closed position. The function of the shield-plate X is to shield the disk and the escapement about the same from the effect of outer disturbances or adverse air-currents.

My invention is shown embodied in the form of construction deemed preferable and is easily applied to use, it being understood that the rear portions of the cross-head bars H and J are of such dimensions, and the recesses K are of such form, that when the cross-head bars are bolted to the body F the carriage will be slidingly supported on the guide-bars C. The air-tube G is then connected to the air-pipe D by the suitable union-connection G³, and the collar G¹ is set in proper position with reference to the blow-pipe to be used and to the tension desired in the spring O.

In the operation of my invention the carriage is lowered in the usual manner to proper position. The blow-pipe is then so disposed by the operative that the collar P³ will engage the horns H² and the end P² will engage the socket N¹ of the coupling N; the blow-pipe will then of its own weight assume the vertical position and will be clamped in position by the spring-clamp L. The strain of the spring O is such that when so resisted by the placing in position of the blow-pipe as just described, the jointure of the end P² and the socket N¹ will be air-tight. The carriage is then lowered and the blow-pipe dipped into the molten glass that is retained in the drawing-kiln. The air-pressure is then introduced and is controlled together with the control of the raising of the carriage, in the usual way. Upon completion of the neck, the valve Q is opened, and the blowing of the cylinder commences, the air-pressure being of pre-determined degree, and the gage-arm W and support-clamp T having been set accordingly, so that the normal escapement will be through the conduit Q, drum R and hole S¹. If for any reason, as the carriage rises and the cylinder is being formed, there should be any interruption of the smooth and regular travel of the carriage, the tendency of the air-pressure in the cylinder to increase momentarily and to produce the objectionable puff or distention is immediately overcome by the automatic and instant action of the delicately balanced disk S which will move permitting such escapement and then stopping the same in such manner that the air-pressure within the cylinder is maintained equable throughout the entire operation of blowing the same.

What I claim as new and desire to secure by Letters Patent of the United States, is—

1. In glass making machinery of the kind described the combination of a carriage, a forked support arm thereon having its tines curved upwardly, a blow pipe provided with an annular lug near its upper end and sustained thereby removably on said forked support, the end of said blow-pipe being rounded, an air-tube carried by the carriage, and slidingly disposed therein above the blow-pipe and having its bottom provided with a socket to fit the rounded end of the blow-pipe, a lug on said air-tube to support same when it is not in engagement with the blow-pipe, a spring arranged between the lower end of the air-tube and the carriage to press the air-tube against the blow-pipe, when the latter is disposed in position on the forked support.

2. An attachment for glass forming machinery of the kind described, comprising an air drum of diameter substantially larger than that of the air tube, a conduit to enter centrally the closed side of said air drum and adapted to be connected to the air tube, a plate hingedly supported and balanced exteriorly on the open side of said air drum so as to normally close the said open side of said air drum, but which is free to swing open.

3. An attachment for glass forming machinery of the kind described, comprising an air-drum adapted to be connected to the air-tube, a disk supported on said air-drum to yieldingly close the same, a shield secured to said air-drum and inclosing said disk, substantially as described.

4. In a glass forming machine of the kind described the combination of the air-tube, of a conduit secured thereto having a valve therein, an air-drum secured to said conduit and having an adjustable support member thereon, a disk to fit upon and yieldingly close said air-drum, said disk having a gage-arm to engage said adjustable support member and provided with holes arranged successively therein, substantially as described.

5. In a glass forming machine of the kind described the combination of the air-tube, a conduit secured thereto having a valve therein, an air-drum secured to said conduit and having an adjustable support member thereon, a disk to fit upon and yieldingly close said air-drum, said disk having a gage-arm to engage said adjustable support member and provided with holes arranged successively therein, a shield secured to said air-drum and inclosing said disk, substantially as described.

In testimony whereof I have signed my name to this specification in the presence of two subscribing witnesses.

WILLIAM W. W. KEYES.

Witnesses:
ETHEL L. LISTER,
THOMAS L. RYAN.